INVENTOR.
DONALD W. HALFHILL
BY
Robert G. Clay
ATTORNEY

INVENTOR.
DONALD W. HALFHILL
BY Robert G. Clay
ATTORNEY

United States Patent Office 3,239,118

Patented Mar. 8, 1966

3,239,118
WEB TRANSPORT SYSTEM

Donald W. Halfhill, Riverside, Calif., assignor to Ampex Corporation, Redwood City, Calif., a corporation of California Filed Dec. 27, 1963, Ser. No. 333,964
2 Claims. (Cl. 226—13)

This invention relates to web transport systems, and, more particularly, to an improved web transport system embodying means for precisely driving the web at relatively low speed.

The present invention finds particular utility in recording systems in which data is recorded on a web material over a relatively long time interval, such as when monitoring a series of actions or steps in a process that may take hours to complete. In such situations, it is often desirable to move the recording medium as slowly as feasible to conserve recording space on the medium. Nevertheless, the recording medium must be moved at as constant speed as is possible, so that the exact time at which recorded events occur can be accurately determined. An aircraft flight recorder is one example of this type of system. Similar speed requirements are found in many instrumentation applications involving acquisition of large amounts of relatively slowly varying data. Here the time base may be identified by use of a separate timing track, but speed variations in the web may result in loss of data or the introduction of errors in the data. In other instances, data is often stored at very slow speeds, for later transmission at very high speeds, as in a telemetry system. In these applications the speed variation at low speed must be kept very small so that flutter variations will be at a minimum.

The primary problem involved in moving a tape or other web member at relatively very slow speed, of the order of fractions of an inch per second, derives from the difficulties involved in obtaining adequate speed stabilization by mechanical or electronic means. A typical fly wheel system presents very low rotational energy at such speeds unless it is made extremely large. Speed variations of substantial magnitude are introduced if a gear or other reduction system is used without some form of stabilization. An electronic control system may be used, but it must have a very finely divided position or speed reference device, and the servo circuits must have excellent response for proper low speed control. Obviously, it is not desirable to employ a large flywheel for a typical slow speed recorder, because of the relative disparity in sizes and weights. Similarly, an electronic system of sufficient speed sensitivity and stability at extremely low speeds would be unduly expensive for most applications and the above mentioned speed or position indexing device exceeds present technological capabilities. As is well known to those skilled in the art, longitudinal speed variations (referred to variously as flutter, wow, or instantaneous speed variations, depending upon the particular effect or environment) disproportionately increase as the speed of a moving web member is reduced.

It is therefore a primary object of the invention to provide a web transport system which embodies means for driving a web material at relatively low speed, of the order of a fraction of an inch per second, and yet with virtually constant velocity.

It is another object of the invention to provide a web transport system embodying means dependent on the principles of mechanical inertia to minimize changes in speed of transport of the web material.

It is a more specific object to provide a compact, low mass system for stabilizing the speed of movement of a web material, while also permitting operation at higher speeds or intermittent operation.

Because of its convenience, the invention of the present system will be described with reference to a magnetic tape recording system. However, it is to be understood that the invention may be embodied in numerous other systems in which exact control of the speed of a slowly moving web material is required.

Broadly speaking, the present invention includes a rotating member for driving a web material, such as magnetic tape, between supply and takeup reels at very low but precisely maintained speeds. In accordance with the teachings of the invention, a drive capstan may be coupled to a flywheel, within which is mounted a gyroscopic device. The inertia characteristic of the gyro is arranged to add to that of the flywheel to minimize acceleration and deceleration of the drive capstan at selected low speed, and yet the combination may occupy no more space in the system than a small flywheel alone.

Other aspects of the invention provide selective control of the speed stabilization effect. Thus, the stabilizing means may be immobilized to permit much higher tape speeds, utilized to permit operation at variably selected speeds, or controlled in intermittent fashion to provide rapid start-stop operation.

Further objects, features and advantages of the invention will become apparent from the following detailed description, taken in conjunction with the accompanying drawings, in which.

Figure 1:
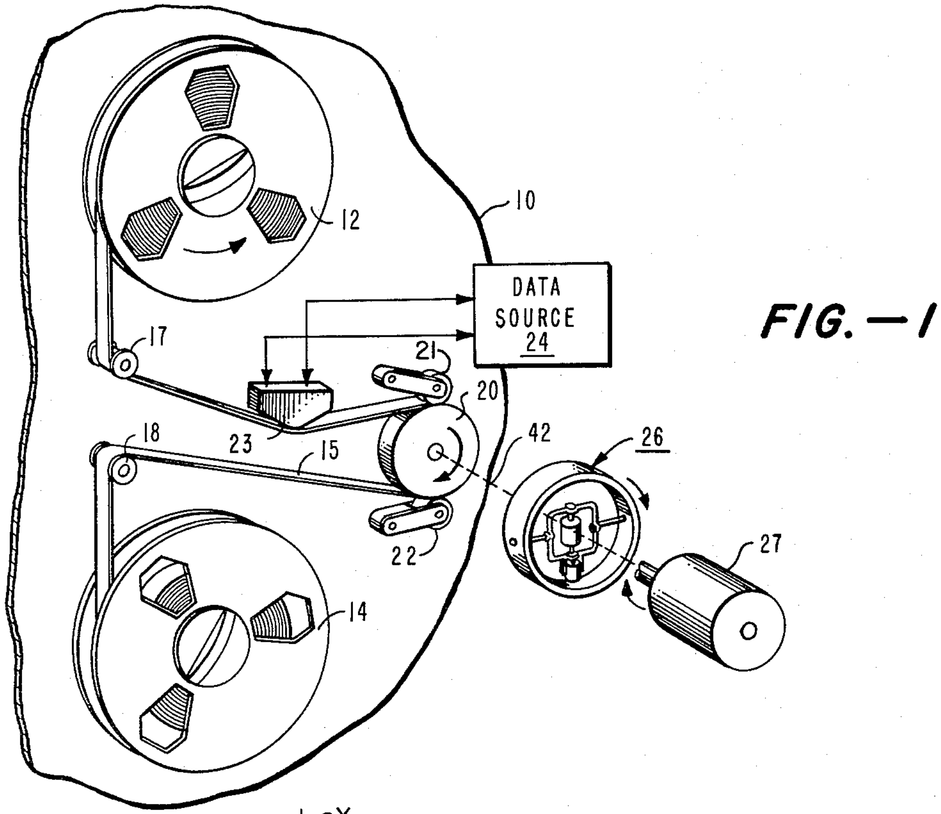
FIG. 1 is a fragmentary front view of a tape transport system in accordance with the invention which utilizes a flywheel and gyroscope means.
Figure 2:
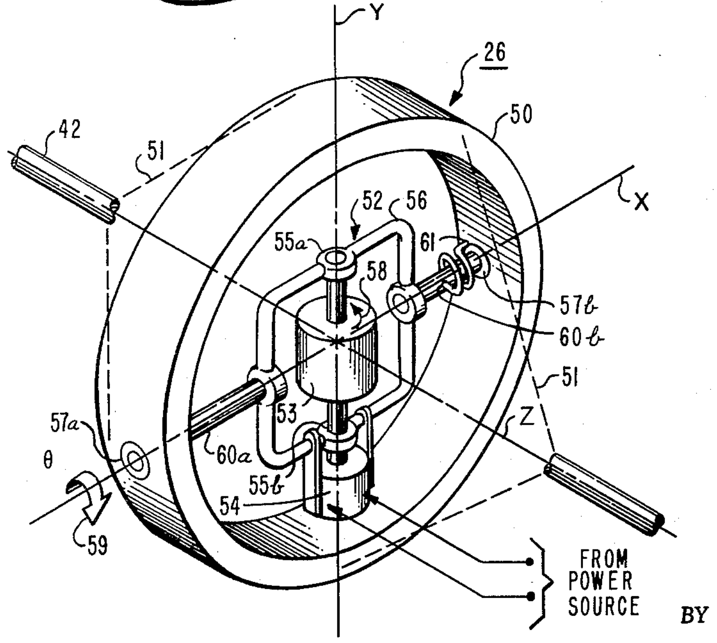
FIG. 2 is a diagrammatic perspective view of the flywheel and gyroscope means that stabilize the speed of tape movement in accordance with the teachings of the invention.

One system in accordance with the invention is shown in an idealized perspective view in FIG. 1, and particular details thereof are shown in FIG. 2. The arrangement of FIGS. 1 and 2 constitutes a tape transport which is particularly suited for use in an instrumentation application involving the acquisition of relatively slowly varying data provided over very long intervals. Therefore, it is desired to advance the tape at at very low (fractions of an inch per second) rate, although the rate of tape travel must vary as little as possible. With very slowly changing data, and consequently low bandwidth requirements, or with digital conversion of the data prior to recording, readings taken over very long intervals can be recorded on a relatively short length of tape. Although the invention is described in terms of a system utilizing magnetic tape and reel-to-reel transfer of the tape, it will be appreciated that many other arrangements and web or other strip elements may be utilized. The web may be provided in the form of an endless coil, or in the form of an endless loop. The member which is being advanced may comprise a graphic strip chart, a thermoplastic tape, or some other form of extended record member. No matter what the application, the invention will be seen to apply to stabilization of the advancement rate of the record member under all analogous conditions of operation.

The tape transport system is mounted on a front panel 10 which is shown in partial view only, the remainder of the tape transport mechanism being housed in a console which may be of conventional design. Tape supply and take-up reels 12, 14 respectively are rotatably mounted so as to advance the tape 15 in either direction of movement. The tape path between the reels 12, 14 may take many forms, inasmuch as different guiding and driving mechanisms may be utilized for different purposes. For example, various tape loop buffering mechanisms, in the form of multiple loop tension arms or air chambers are employed for intermittent, bidirectional operation, with which a tape advance system in accordance with the invention is also feasible. Various guiding mechanisms may also be used for minimizing tape skew and for introducing a desired amount of tension across the associated transducer assembly. The arrangement of FIG. 1 illustrates a continuously operating system, in which the tape 15 is confined by a pair of guides 17, 18 to a reentrant path which provides a large angle of wrap about a drive capstan 20. A pair of pinch rollers 21, 22 on opposite sides of the drive capstan hold the tape firmly against the drive capstan 20, so that the capstan speed controls the tape speed, while constant torque or servo motors (not shown) coupled to drive the reels 12, 14, provide supply and take-up of the tape. Between the capstan 20 and the guide rollers 17, 18, a magnetic transducer assembly 23 coupled to a data source 24 is positioned in operative relationship to the tape 15. The magnetic transducer assembly 23 may comprise one or a number of head assemblies, depending upon whether single or multiple track recording is utilized, and whether reproduce and erase functions are to be performed as well as recording functions.

The capstan 20 is rotated by a drive system principally comprising a stabilized flywheel means 26 driven from a source of rotational power 27, such as a suitable low speed motor. Alternatively, a higher speed motor with a step down gearing or belt drive may be employed. The stabilized flywheel means 26 is shown in greater detail in FIG. 2, to which reference may now be made.

In order to maintain the rotational speed of the tape drive capstan 20 as constant as possible, the mechanical inertia of the drive capstan system is greatly increased. As shown in FIG. 2, the increase in inertia is accomplished by coupling a flywheel on the drive capstan shaft and providing a gyroscope means integral with the flywheel. As shown, an annular flywheel 50 is mounted on the capstan shaft 42 by means of a spider or spoke arrangement, shown only diagrammatically at 51. Mounted within the flywheel 50 is a two-axis free gyroscope assembly, referred to generally by the numeral 52, and referred to hereafter as a gyro.

The gyro 52 comprises a rotor 53 which is rotated by a motor 54. The motor 54 may obtain its motive power in any conventional manner, such as through slip-rings (not shown) on the flywheel 50, with contacting external brushes (not shown). The gyro rotor 53 is rotatably mounted in suitable bearings **55*a* and 55*b* in a gimbal 56, the bearings 55 being located on a diameter of the flywheel denoted as axis Y. The gimbal 56 is likewise mounted on a two-piece shaft 60*a*, 60*b*, rotatable in suitable bearings 57*a* and 57*b*, respectively, in the flywheel 50 on a diameter normal to the axis Y, which is denoted axis X. Of course, the gyro rotor 53 is mounted within the gimbal 56, while the gyro motor 54 is hung below the gimbal with the housing secured thereto and the drive shaft is mechanically connected to the rotor 53**. The motor may also be inside the gyro wheel.

It is a well known principle of physics that the spin axis of a gyro will tend to remain in a fixed position in space unless the gyro is acted upon by an outside force such as gravity or some other force. When the external force acts upon the gyro, the gyro tends to rotate about an axis normal to its spin axis and to the axis about which the external force tends to rotate it. The latter rotational movement of the gyro is known as precession. In other words, and referring to FIG. 2, if the gyro rotor is spinning about the axis Y and is acted upon by an external force which acts to rotate it about the axis X, the gyro will tend to precess about an axis coincident to the axis of rotation of the drive capstan shaft, denoted axis Z. Such movement has the effect of adding relatively high inertia to the flywheel 50.

The direction of rotation of the gyro rotor 53 and the direction of application of the external force are shown by the arrows 58 and 59, respectively. The external force to cause the gyro to rotate about the axis X may be applied by a spring 61, one end of which is secured to the flywheel 50 and the other end of which is secured to the shaft **60*b* on which the gimbal 56 is mounted in the flywheel 50**.

The application of an external force to a rotating gyro will have a predictable result on precession of the spin axis of the gyro, as given by the equation:

$$T=I\omega_r\omega_c \tag{1}$$

where T is the external torque applied about one of the gyro gimbal axes, I is the rotor moment of inertia, $\omega_r$ is the angular momentum of the rotor, and $\omega_c$ is the precession velocity of the rotor. Equation 1 can be rewritten as:

$$\omega_c=T/I\omega_r \tag{2}$$

If the external torque T is replaced by a spring torque, the following equation results:

$$\omega_c=K\theta/I\omega_r \tag{3}$$

where K is the spring constant and $\theta$ is the angle through which the gimbal is rotated against the spring. The acceleration $\alpha_c$, which is the rate of change of precessional velocity with respect to time, may be defined by the following equation:

$$\alpha_c=K\theta'/I\omega_r \tag{4}$$

where $\theta'$ is the time rate of change of the angle through which the gimbal is rotated by the spring. For a flywheel, the acceleration $\alpha$ is known to be represented by the following equation:

$$\alpha=T_c/I_c \tag{5}$$

where $T_c$ is a disturbance torque, and $I_c$ is a flywheel moment of inertia.

It is apparent from the foregoing equations that the acceleration of a gimbaled gyro about a precessional axis has essentially the same effect as a simple inertial mass, in which the precessional angle of the rotor operating through a spring simulates a disturbance torque. Therefore, a gyro system as heretofore described has many of the stabilizing properties of simple inertial mass, but with greatly increased energy storage within a given volume compared to that of an inertial mass.

The acceleration $\alpha_t$ of a combined gyro and flywheel can be approximately expressed by the following equation:

$$\alpha_t=\frac{1}{\frac{1}{T_c/I_c}+\frac{1}{K\theta'/\omega_r}} \tag{6}$$

Equation 6 does not take into account cross-coupling factors that give rise to mutation, but it does show the effective relationship between flywheel inertia and the gyro stabilizing effect. Thus, it is apparent that to achieve minimum acceleration, the rotor angular momentum $\omega_r$ and moment of inertia I of the gyro should be as large as possible, and the spring constant should be as small as possible. When these conditions are met, the gyro provides a proportionally much greater stabilizing effect than the flywheel itself.

Figure 3:
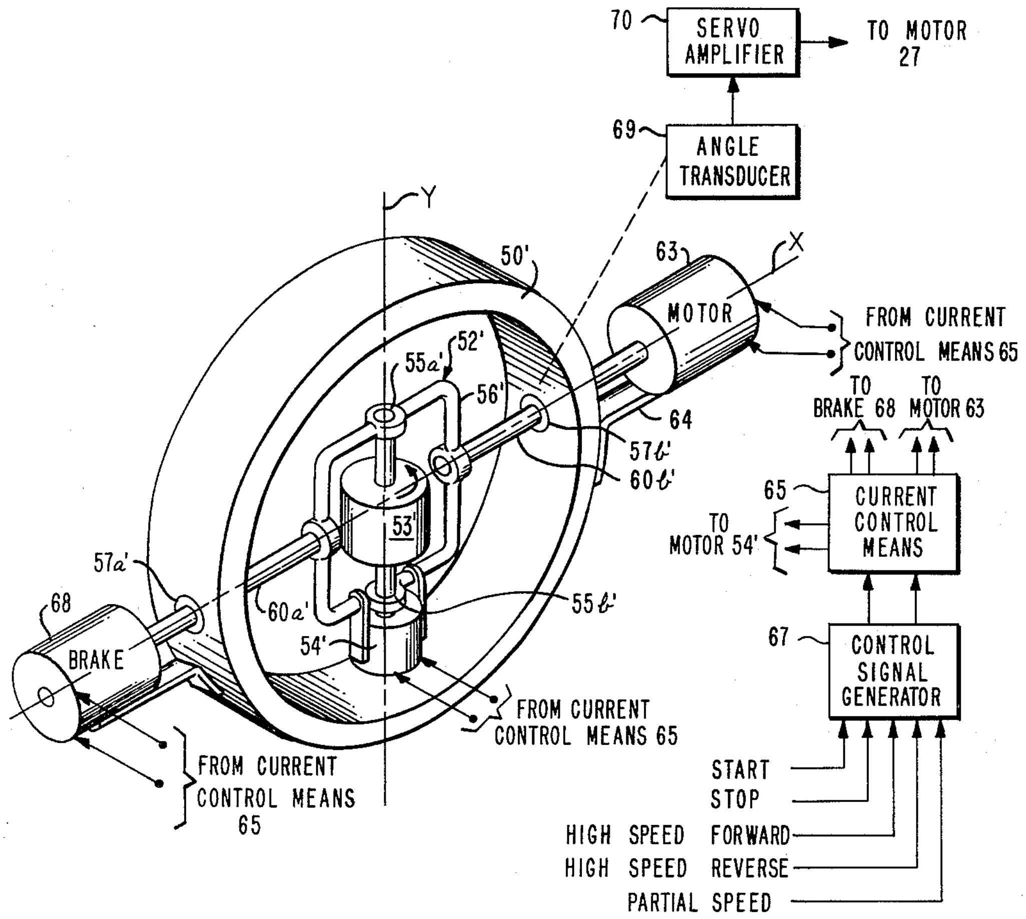
FIG. 3 is a diagrammatic perspective view of a modified form of web transport speed stabilizing means in accordance with the invention for providing variable and selective speed control.

FIG. 3 illustrates a modified form of speed stabilizing assembly that embodies certain other features in addition to those described with reference to FIG. 2. Corresponding parts shown in FIGS. 2 and 3 bear like reference numerals, with those in FIG. 3 having a prime (′) suffix. In the assembly shown in FIG. 3, the spring that tends to rotate the gyro assembly 52′ about the axis X is replaced by a small, variable-torque motor 63. One piece 60b of the two-piece shaft on which the gimbal 56′ is mounted extends through bearings 57b′ in the flywheel 50′ and is mechanically connected to the torque motor 63. The motor 63 may be mounted on the flywheel 50′ by conventional means, such as a bracket 64. Of course, the flywheel 50′ is mounted on, or mechanically connected to, the shaft 42 on which the drive capstan is mounted, such connection being omitted from FIG. 3 for purposes of clarity.

The variable-torque motor 63 may be energized by conventional current control means 65, shown in block diagram form. As is well known, the torque exerted by a torque motor is a function of the current supplied to the motor. Thus, by controlling the current supplied to the motor 63 the rotational force about the X axis applied to the gyro assembly 52′ through the gimbal 56′ may be varied. This, in turn, controls the precessional torque of the gyro assembly. Therefore, by selecting different levels of motor current, the tape drive capstan can be driven at selected speeds within a control range. By appropriately energizing the motor 63, the capstan may be rapidly started or stopped by use of the precessional torque in an accelerating or decelerating fashion. The system still has the advantage of high inertia operation, as previously described.

Use of this arrangement in a system such as a multi-speed digital tape transport, requires only that the current control means 65 coupled to the variable-torque motor be operated in cooperative relation to the capstan motor. Conventional control signals (e.g. start, stop, high speed forward and high speed reverse) may be applied to a control signal generator 67 which operates responsively to provide distinct start-stop impulse waveforms, and bias levels for selected speeds. The current control means 65 then energizes the motor in accordance with the signals which are applied.

In this gyro system, it is important that the gyro gimbal 55a′ be kept nearly perpendicular to the spin axis of flywheel 50′ since a deviation from this position represents a loss of effective inertia. A torque operating about the spin axis of flywheel causes the gyro to precess about the axis through supports 60a′ and 60b′. This deviation can be corrected by applying a controlled torque to the source of rotational power 27 of FIG. 1. The control of the torque can be accomplished by a suitable servo amplifier 70 where the controlling signal is derived from an angle transducer 69, the output of which controls the motor 27 through a servo amplifier 71.

Any conventional angle transducer may be used for generating the desired error signal for the servo amplifier 70. To avoid the introduction of appreciable mass or inertia to the gyro system, however, it is preferred to use an optical type of transducer. Thus a thin disk having a graduated reflectance may be mounted on the support 60b, and an optical sensing device, such as a photosensitive semiconductor, may be mounted on the flywheel 50′. The photosensitive element is, in conventional fashion, positioned to generate a signal depending upon the angular position of the gyro gimbal 55a′ relative to the spin axis of the flywheel 50′.

The operation of this gyro system is best understood by considering a typical operating sequence. For this purpose, it will be assumed that the system is initially in equilibrium at the lower of the two speeds. The rotation of the flywheel 50′ causes the spin axis of the rotor 53′ to be rotated in the X-Y plane. This rotation creates a precessing force tending to rotate the spin axis of the gyro rotor 53′ about the axis X. However, with the system in equilibrium, this precessing force is exactly balanced by the torque from the motor 63, or in the case of the system shown in FIG. 1, by the force of the spring 61, so that the spin axis of the gyro remains substantially coincident with the axis Y.

Assume now that the higher capstan speed is desired. Accordingly, the signal from the control means 65 increases the torque of the motor 63. This increased torque, which is now greater than the precessing force, tends to rotate the spin axis of the gyro rotor 53′ about the axis X, but in the opposite direction from that caused by rotation of the flywheel 50′. The gyro thus tends to precess about the axis coincident with the axis of rotation of the flywheel, which would increase the speed of rotation. However, due to the inertia of the flywheel, the speed of the system cannot be immediately increased by the resulting force of precession. Accordingly, the inertia of the flywheel, acts to apply an acceleration retarding force through the bearings 57a′ and 57b′ to the gimbal shafts 60a′ and 60b′, thereby causing the gyro to precess about the axis X in the direction of the increased torque.

This precessing movement about the axis X is sensed by the angle transducer 69, which responds to provide an accelerating torque to the motor 27. As the flywheel 50′ is accelerated, the spin axis of the rotor 53′ is rotated faster in the X-Y plane. This increased speed of rotation in turn results in an increase in the precessional force of the gyro about the axis X, this precessing force being opposite to the direction of the increased torque exerted by the motor 63. As the flywheel speed reaches the desired higher speed, this precessing force equals the increased torque, and continues until the spin axis of the gyro is returned to the axis Y. No signal is then produced by the angle transducer 69 thus removing the increased torque from the motor 27 so that the system is again in equilibrium.

The operating sequence is reversed when going from the higher speed to the lower speed by reducing the torque from the motor 63. In this case, the angle transducer 69 senses a movement of the spin axis in the other direction to deliver a decelerating torque to the motor 27 to bring the system into equilibrium. Obviously, such a system offers like advantages in maintaining a constant speed.

FIG. 3 also shows means cooperating with the gyroscope assembly to index and cage the gimbal mechanism and stop the rotor. A magnetically actuated brake 68 supported on a bracket and mounted about the end of an extension of the gimbal shaft 60a′ may be used to restrain the gimbal mechanism. The motor 54 may be stopped by applying an appropriate decelerating signal. Thus, when the system is shifted to a high speed mode, appropriate signals for a control signal generator 65 to energize the brake 68 and decelerate the motor 54 to immobilize the gyroscope assembly. Alternatively, the gyroscope assembly may be immobilized in other ways, as by engagement of conventional gimbal stops and otherwise braking the motor 54. In any event, the gyroscope appears only as a simple mass in the system once immobilized.

It is apparent from the foregoing description that the invention provides a stabilizing system that effectively provides a high inertial mass in a relatively small volume. Many mechanical details have been omitted from the drawings and description in order to make the basic invention clearly apparent; such details can be easily supplied by one skilled in the art. Of course, many modifications may be made in the described apparatus without departing from the spirit and scope of the invention, as defined by the appended claims.

What is claimed is:

1. In a tape transport system, wherein a tape is driven by a capstan having an axis of rotation; an annular flywheel coupled to said capstan and rotatable about the capstan axis; a gyroscope assembly mechanically connected to said flywheel; means coupled to said flywheel for driving the tape past the capstan; means coupled to rotate the rotor of said gyroscope assembly about a selected axis substantially normal to said capstan axis of rotation; variable torque means driving said gyroscope assembly about an axis normal to both the capstan axis of rotation and the selected axis, whereby said gyroscope assembly precesses about an axis substantially coincident with said capstan axis of rotation; means controllably energizing said variable torque means, thereby to vary capstan and tape speed; and means coupled to said gyroscope assembly for selectively terminating the precession thereof.

2. In a tape transport system, wherein a tape is driven at extremely low speed by a capstan having an axis of rotation, the combination of: an annular flywheel coupled to said capstan; servo motor means coupled to said flywheel for rotating said flywheel about the capstan axis of rotation; a gimbal frame mounted within said annular flywheel, said gimbal frame having a pair of aligned shafts extending from opposite sides thereof and journalled for rotation in said flywheel about a diameter thereof; a gyroscope rotor mounted for rotation within said gimbal frame about an axis perpendicular to said gimbal frame shafts, said rotor having a preferred axial alignment that is normally in the plane of said flywheel; a motor mounted on said gimbal frame for driving said rotor; a variable torque motor mounted on said flywheel for driving one of said gimbal frame shafts; means for sensing the displacement of the rotor from the plane of said flywheel; means responsive to said sensing means for applying a variable drive signal to said servo motor to maintain the rotor axis in the plane of said flywheel; and brake means mounted on said flywheel and coupled to one of said gimbal frame shafts for selectively terminating the precessing of said gyroscope assembly.

References Cited by the Examiner

UNITED STATES PATENTS

| | | | |
|---|---|---|---|
| 3,053,095 | 9/1962 | Koril et al. | 73—504 |
| 3,112,052 | 11/1963 | Johnson | 226—42 |
| 3,141,339 | 7/1964 | Koril | 74—5.22 X |

M. HENSON WOOD, JR., *Primary Examiner.*

ROBERT B. REEVES, *Examiner.*

J. N. EHRLICH, *Assistant Examiner.*